United States Patent [19]

Sato et al.

[11] 4,266,833
[45] May 12, 1981

[54] METHOD OF PREVENTING SKID OF WHEELS OF A VEHICLE

[75] Inventors: Makoto Sato, Kamifukuoka; Taiji Ohmori; Yoshikazu Tsuchiya, both of Kawagoe, all of Japan

[73] Assignee: Honda Giken Kogyo Kabushiki Kaisha, Tokyo, Japan

[21] Appl. No.: 1,214

[22] Filed: Jan. 5, 1979

[30] Foreign Application Priority Data

Jan. 18, 1978 [JP] Japan .................................... 53-3848
Mar. 15, 1978 [JP] Japan .................................. 53-30192

[51] Int. Cl.³ .............................................. B60T 8/08
[52] U.S. Cl. ................................... 303/106; 303/110
[58] Field of Search ........................ 188/181; 244/111; 303/20, 93, 96, 97, 103, 105, 106, 109, 110

[56] References Cited

U.S. PATENT DOCUMENTS

| 3,744,851 | 7/1973 | Burckhardt et al. | 303/20 X |
| 3,863,993 | 2/1975 | Fleischer et al. | 303/20 X |
| 3,874,741 | 4/1975 | Schnaibel et al. | 188/181 A X |

*Primary Examiner*—William H. Beha, Jr.
*Assistant Examiner*—Reinhard J. Eisenzopf
*Attorney, Agent, or Firm*—Haseltine and Lake

[57] ABSTRACT

A method of preventing wheels of a vehicle from skidding in which a wheel-acceleration signal representative of the peripheral acceleration of a wheel is obtained by differentiating a wheel-shaped signal representative of a suitably detected peripheral speed of the wheel. The braking torque applied to the wheel during braking is controlled and held constant when the level of a wheel-acceleration signal is higher than that of a first reference wheel-acceleration signal and lower than that of a second reference wheel-acceleration signal, whereas it is increased when the level of the wheel-acceleration signal is higher than that of the second reference wheel-acceleration signal. A reference wheel-speed signal, representative of a predetermined reference wheel speed, and a reference wheel-deceleration signal are set for comparison with the wheel-speed signal and the wheel-acceleration signal, respectively, and the brake torque is held constant when the level of the wheel-acceleration signal is higher than that of the reference wheel-deceleration signal and lower than that of the second reference wheel-acceleration signal if the level of the wheel-speed signal is lower than that of the reference wheel-speed signal. The brake torque is further controlled to increase when the level of the wheel-acceleration signal is higher than that of the second reference wheel-acceleration signal.

3 Claims, 14 Drawing Figures

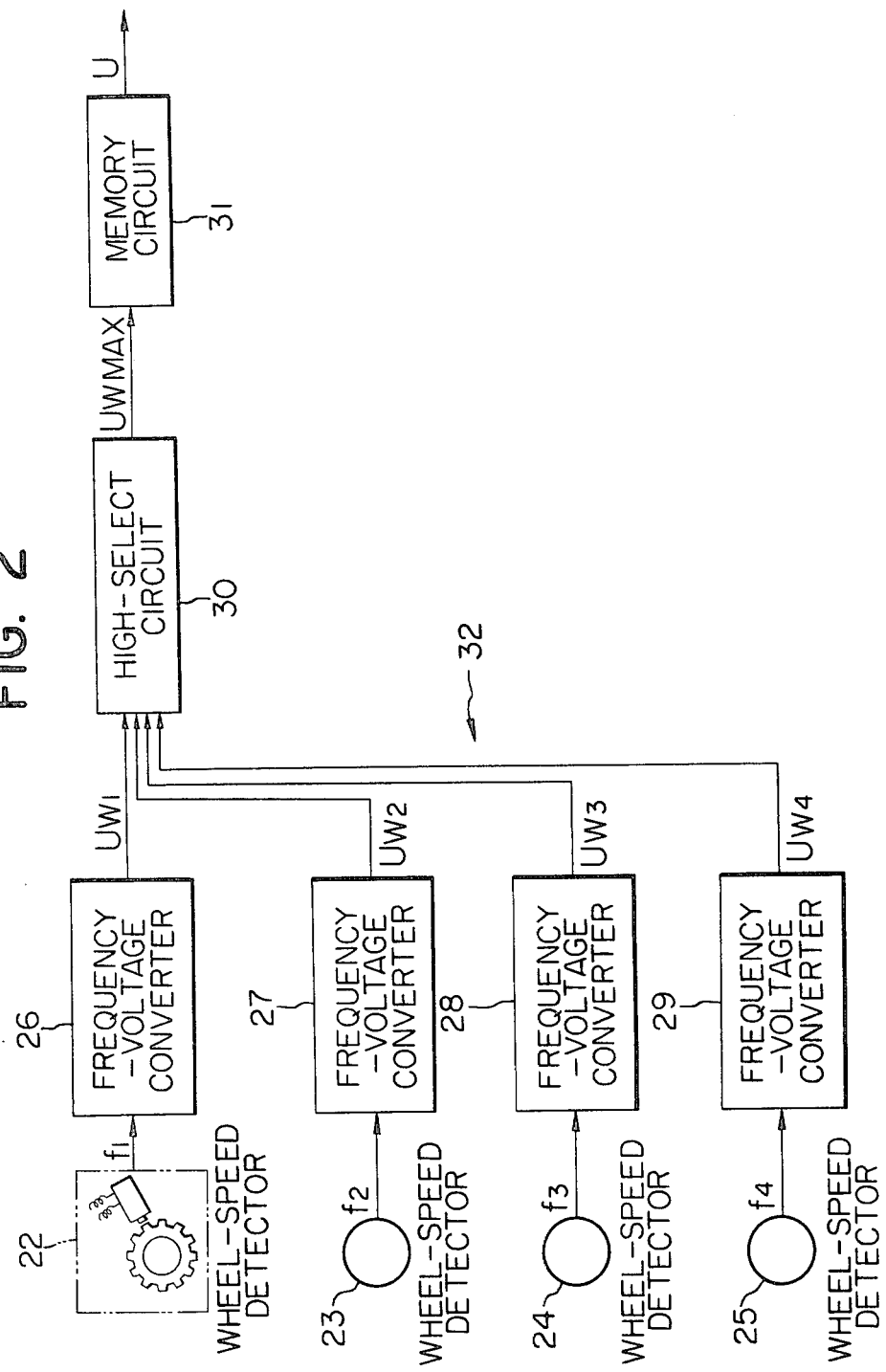

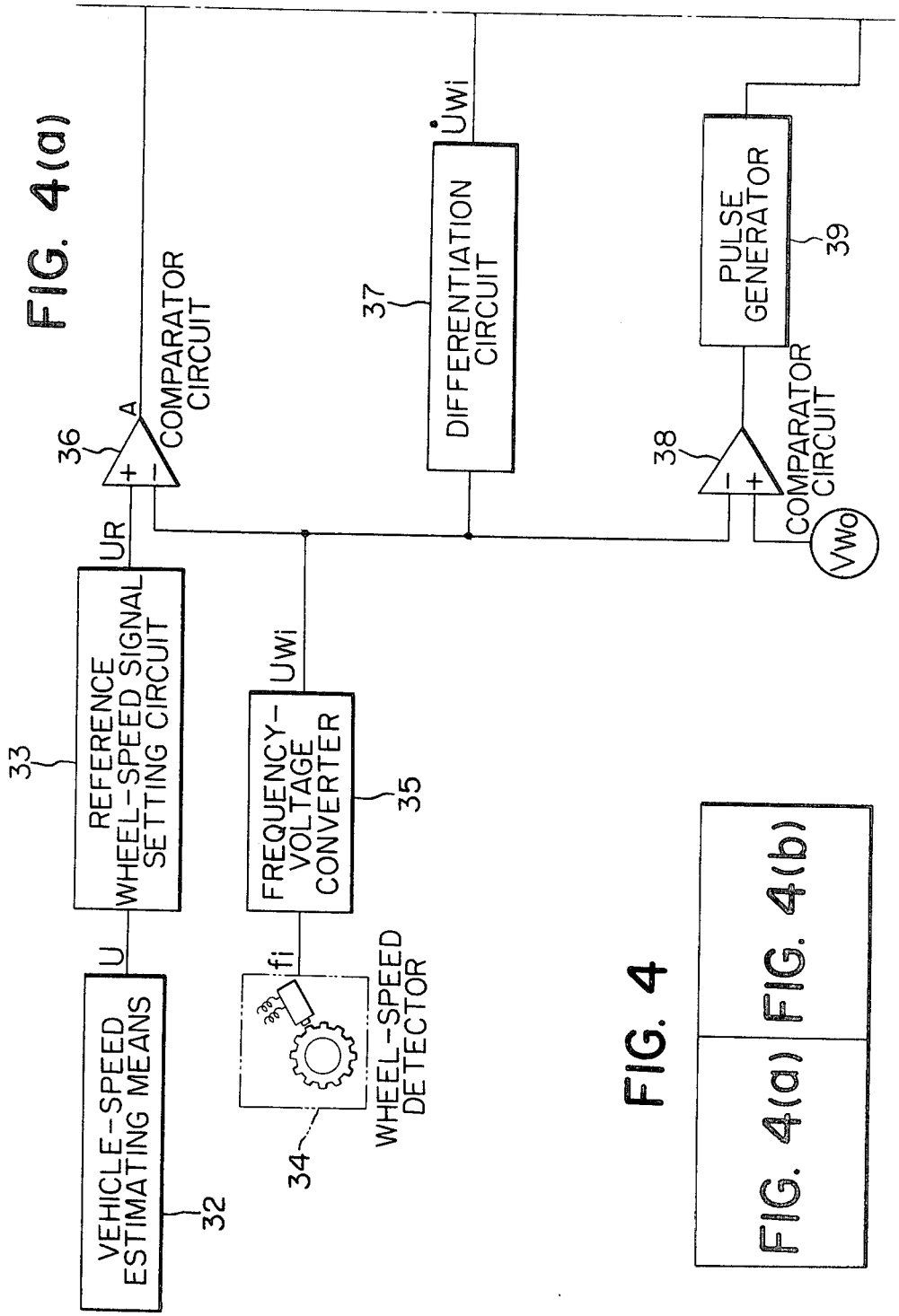

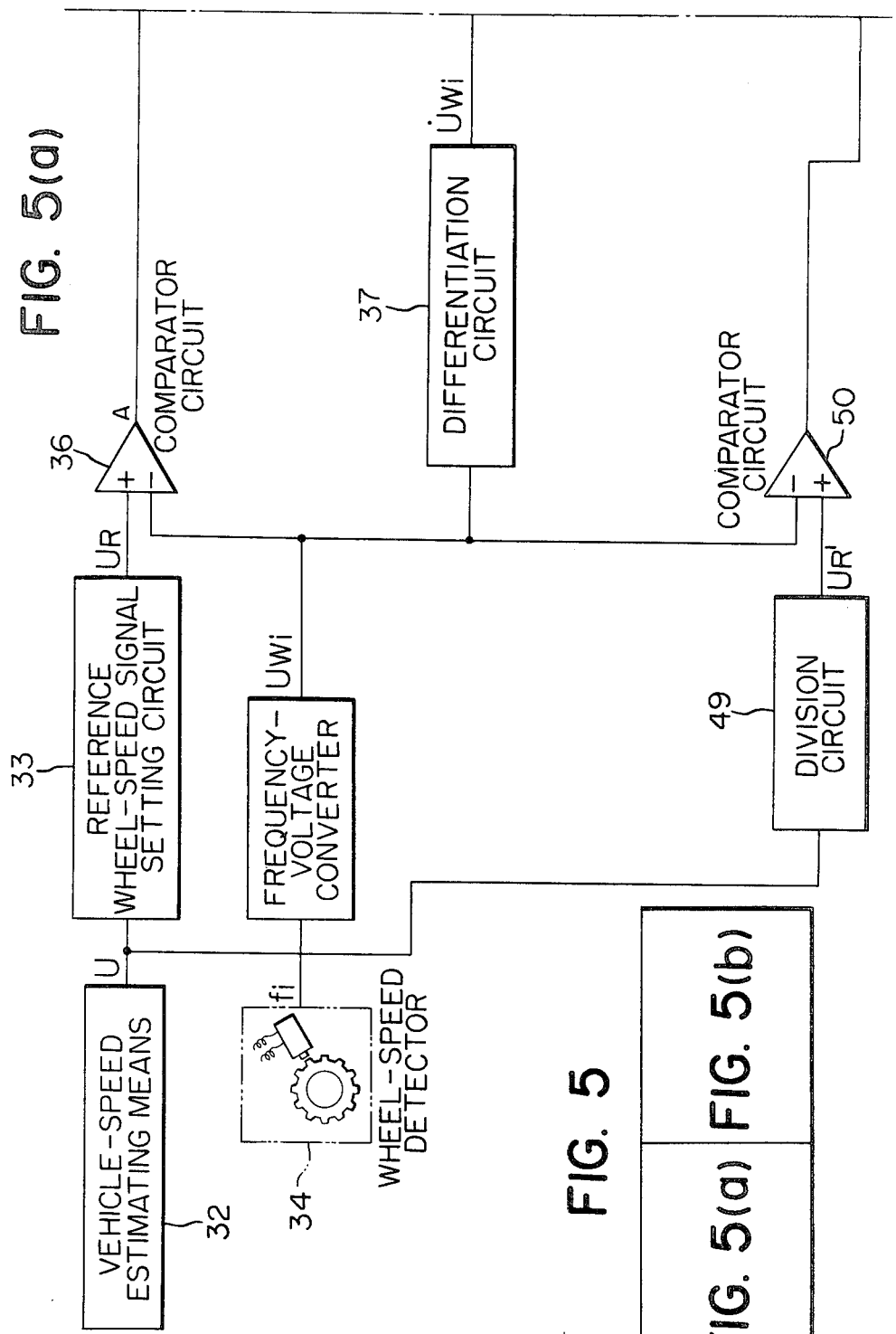

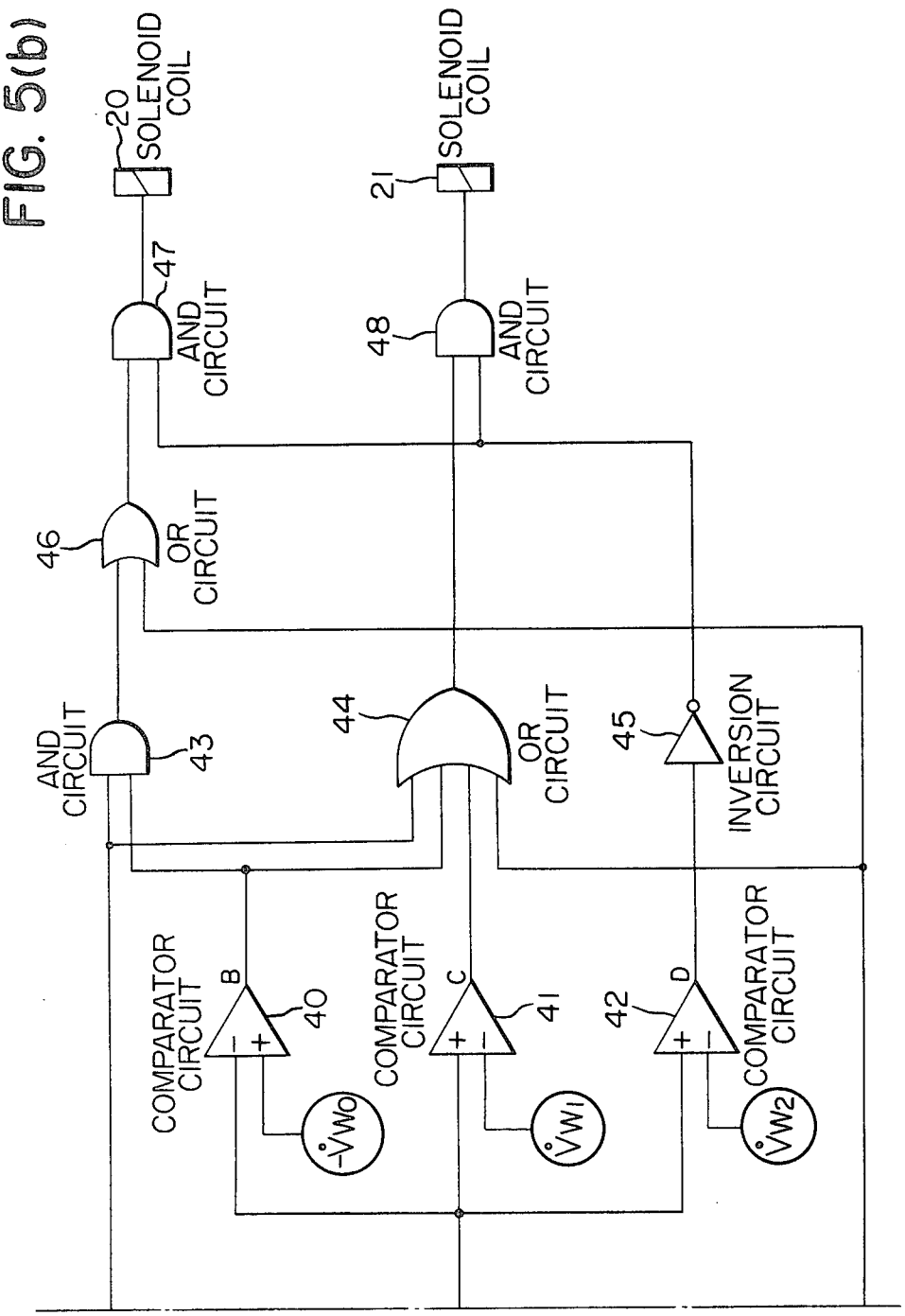

| FIG. 7(a) | FIG. 7(b) |

METHOD OF PREVENTING SKID OF WHEELS OF A VEHICLE

BACKGROUND OF THE INVENTION

1. Field of the Invention

The present invention relates to a method of preventing the skidding of wheels of a vehicle, in which the mode of control of the braking torque and the timing of the generation controlling power are suitably controlled in accordance with the result of a comparison of a wheel-acceleration signal representing the magnitude of the acceleration of wheel with the reference wheel-acceleration signal representative of the magnitude of a reference acceleration of wheel.

2. Brief Description of the Prior Art

When a vehicle is abruptly stopped, the wheels of the vehicle may be locked if the braking input to these wheels is too large. Once the wheels are locked during braking, not only is the braking efficiency lowered but also the directional stability and steerability of the vehicle are lost dangerously.

The above stated danger can be avoided by automatically controlling the braking torque exerted on the wheel, irrespective of the braking input provided by the driver, such that the slip rate of the wheel falls within an appropriate range, e.g. between 15 and 20%.

To this end, various anti-skid braking methods have been proposed up to now but any of them are not satisfactory from the point of view of performance, reliability and economy.

Generally, in the conventional anti-skid method as proposed, the acceleration of the wheel, as well as the deceleration, i.e. the negative acceleration of the wheel is detected, and the braking torque is controlled by judging the possibility of wheel lock from the magnitudes of acceleration and deceleration.

However, it is difficult to control under various conditions the braking torque in such a manner as to make the slip rate fall within an appropriate range, if the control relies solely upon the magnitude of acceleration and deceleration of the wheel. It is therefore desirable to use the slip rate in a suitable manner as one of the controlling factors.

The term "slip rate" is used here to mean a rate which is given by the following equation:

$$\lambda = 1 - Vw/V$$

where, $\lambda$, $Vw$ and $V$ represent, respectively, the slip rate, peripheral speed of the wheel and the speed of vehicle.

As will be understood from the above equation, there is no direct relation between the slip rate $\lambda$ and the acceleration $\dot{V}w$ of wheel which is obtained by differentiating the peripheral speed $Vw$ of the wheel. It is therefore necessary to detect the speed of the vehicle body, for determining the slip rate of wheel during braking.

Various methods have been proposed for detecting the speed of the vehicle body, i.e. the vehicle speed: i.e. (1) to use a Doppler rader mounted on the vehicle, (2) to detect the vehicle speed from the peripheral speed of a specific non-braked wheel and (3) to calculate the vehicle speed through integrating the acceleration and deceleration. These conventional measures, however, inconveniently require complicated construction of devices and have poor precision and reliability. Thus, it is not easy to obtain a method which affords the detection of vehicle speed in a satisfactory manner, from technical and economical points of view.

SUMMARY OF THE INVENTION

In view of the above, the present invention aims, as its major object, at providing an anti-skid method for preventing the skidding of wheels of a vehicle, in which the slip rate of a wheel as well as the acceleration and deceleration thereof is used as one of essential factors for controlling the brake torque, and in which the brake torque is automatically controlled in a precise and simple manner with high reliability so as to maintain the slip rate within an appropriate range.

Another object of the present invention is to provide an anti-skid method of the character as described, in which required control power is generated without delay in order to precisely control the brake torque in accordance with a predetermined anti-skid control mode.

A further object of the present invention is to develop an anti-skid method of the character as described, in which the vehicle speed can be estimated most accurately by selecting the highest value of a plurality of the peripheral speeds of wheels as detected so as to further improve the efficiency and reliability in the anti-skid controlling operation, and which is practicable enough from both of technical and economical points of view.

According to one aspect of the invention, a wheel-speed signal of a wheel is picked up by detecting the peripheral speed of the wheel. The wheel-speed signal is suitably processed to provide a wheel-acceleration signal representative of the acceleration of the wheel. Meanwhile, a first reference wheel-acceleration signal and a second reference wheel-acceleration signal of a level higher than that of the first signal are set for comparison with the aforementioned wheel-acceleration signal. During the braking, the wheel-acceleration signal is compared with the first and the second reference wheel-acceleration signals. When the level of the wheel-acceleration signal is higher at least than the first reference wheel-acceleration signal and lower than the level of the second reference wheel-acceleration signal, the braking torque exerted on the wheel is kept unchanged. On the other hand, when the level of the wheel-acceleration signal is higher than the level of the second reference wheel-acceleration signal, the braking torque is controlled to increase.

According to another aspect of the invention, a reference wheel-speed signal is set for comparison with the aforementioned wheel-speed signal. During the braking, the wheel-speed signal is compared with the reference wheel-speed signal. If the level of the wheel-speed signal is lower than the level of the reference wheel-speed signal, while the level of the aforementioned wheel-acceleration signal lies within the range between the levels of the first and second reference wheel-acceleration signals, the braking torque exerted on the wheel is kept unchanged.

According to still another aspect of the invention, a reference wheel-speed signal representative of a predetermined reference wheel speed is set for comparison with the aforementioned wheel-speed signal. At the same time, a reference wheel-deceleration signal is set for comparison with the aforementioned wheel-acceleration signal. During braking, the wheel-speed signal is compared with the reference wheel-speed signal, while the wheel-acceleration signal is compared with both the second reference wheel-acceleration signal and the reference wheel-deceleration signal. The braking torque exerted on the wheel is kept unchanged, when the level of the wheel-speed signal is lower than that of the reference wheel-speed signal, if the level of the wheel-acceleration signal is lower than the level of the second reference wheel-acceleration signal and higher than the level of the reference wheel-deceleration signal.

According to a further aspect of the invention, a reference wheel-speed signal representative of a predetermined reference speed of the wheel is set for comparison with the aforementioned wheel-speed signal and, at the same time, a reference wheel-deceleration signal is set for comparison with the aforementioned wheel-acceleration signal. During braking, the wheel-speed signal is compared with the reference wheel-speed signal, while the wheel-acceleration signal is compared with both first reference wheel-acceleration signal and the reference wheel-deceleration signal. When the level of the wheel-speed signal is higher than that of the reference wheel-speed signal, while the level of the wheel-acceleration signal is smaller than that of the first reference wheel-speed signal and higher than that of the reference sheel-deceleration signal, the braking torque exerted on the wheel is increased.

According to a still further aspect of the invention, the peripheral speeds of a plurality of wheels are detected, and an estimated vehicle speed, well approximating the actual vehicle speed during braking, is calculated from the highest one of the detected peripheral speeds and a rate of attenuation of vehicle speed which has been preset. Then, an optimum reference wheel speed is determined from the vehicle speed as estimated and a slip rate as appropriately set for maximization of the braking efficiency.

Other objects and advantages of the invention will be apparent from the ensuing description, when taken in conjunction with the accompanying drawings, which illustrate a few preferred embodiments of the present invention.

BRIEF DESCRIPTION OF THE DRAWINGS

FIG. 2 is a block diagram of an example of means for estimating the vehicle speed;

FIG. 4 is a view showing the association of FIGS. 4(a) and 4(b) with each other;

FIGS. 4(a) and 4(b) are one half and the other half, respectively, of a signal processing circuit and a logical circuit for operating the oil pressure control system as shown in FIG. 1;

FIG. 5 is a view showing the association of FIGS. 5(a) and 5(b) with each other;

FIGS. 5(a) and 5(b) are one half and the other half, respectively, of a modified form of the signal-processing logical circuits;

DESCRIPTION OF THE PREFERRED EMBODIMENTS

Figure 1:
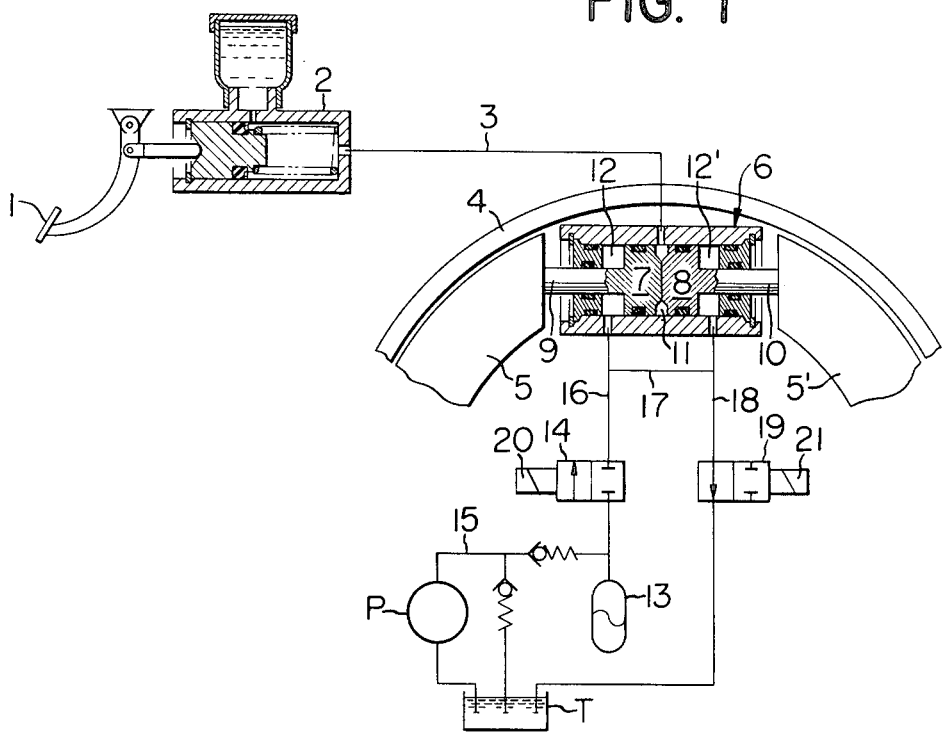
FIG. 1 is a schematic sectional illustration of essential parts of braking system of a vehicle and an oil pressure control system for controlling the braking torque exerted by the braking system, which embody the principles of the present invention.

Referring first to FIG. 1, a brake pedal 1 is operatively connected to a master cylinder 2, such that braking hydraulic pressure is generated in the master cylinder 2 as the brake pedal 1 is depressed by the drive's foot. The master cylinder 2 is connected, through a passage 3, to a braking oil chamber 11 formed between a pair of opposing pistons 7,8 disposed in a wheel cylinder 6 which in turn is mounted on the body of an automobile. The pistons 7,8 have respective piston rods 9,10 which extend outwardly through the end walls of the wheel cylinder 6. These piston rods 9,10 are connected at their outer ends to one pair of brake shoes 5,5' which are adapted to exert a braking torque upon frictional contact with a brake drum 4.

The arrangement is such that, when the brake pedal 1 is depressed, the master cylinder 1 generates the braking hydraulic pressure which is transmitted through the passage 3 to the braking oil chamber 11, so as to press and move the pistons 7,8 away from each other. As a result, the brake shoes 5,5' are pressed against the frictional surface of the brake drum 4, so as to cooperate with the latter to exert a braking torque on the wheel.

If the braking hydraulic pressure in the braking oil chamber 11 is too high, the braking torque produced by the cooperation of the brake shoes 5,5' and the brake drum 4 becomes excessively large, so that the wheel is dangerously locked. In order to avoid this danger, a pair of control oil chambers 12,12' are formed between the pistons 7,8 and correspoinding end walls of the wheel cylinder 6. When the pressure in the braking oil chamber 11 has been raised to such a level as to incur a danger or possibility the locking of the wheel, the oil pressure in the control oil chambers 12,12' is suitably controlled to suppress the movement of the pistons 7,8 caused by the hydraulic braking pressure.

The controlling oil pressure in the control oil chambers 12,12' is controlled by a controller having the following construction and function.

The control oil is sucked from a tank T by means of a pump P and then pressurized for delivery, through a passage 15 and an accumulator 13, to the inlet port of an inlet valve 14 which is adapted to be switched by a solenoid coil 20. The outlet port of the inlet valve 14 is connected, through a passage 16 to a control oil chamber 12 and further to the control oil chamber 12' through a passage 17. The control oil chamber 12 is connected, through passages 16, 17 and 18, to the inlet port of an outlet valve 19 which is adapted to be switched by a solenoid coil 21. The control oil chamber 12' is also connected to the inlet port of the same outlet valve 19, through the passage 18. The outlet port of the outlet valve 19 is in communication with the oil tank T.

The inlet valve 14 is normally held at a rightwardly biased position as viewed in FIG. 1. In this state, the control oil chambers 12,12′ are disconnected from the pump P and the accumulator 13. As the solenoid coil is energized upon receipt of a signal, the inlet valve 14 is switched to assume the left-hand side position as viewed in FIG. 1, so that the control oil discharged from the pump P is delivered to the control oil chambers 12,12′ through the accumulator 13 and the inlet valve 14, so as to bias the pistons 7,8 toward each other, against the braking hydraulic pressure in the braking hydraulic chamber 11.

The outlet valve 19 is normally held at a leftwardly biased position as viewed in FIG. 1. In this state, the control oil chambers 12,12′ are opened to the tank T via the outlet valve 19. As the solenoid coil 21 is energized by a signal delivered thereto, the outlet valve 19 is switched to assume the rightwardly biased position as viewed in FIG. 1, so that the control oil chambers 12,12′ are disconnected from the tank T.

In a first state of operation in which the inlet valve 14 and the outlet valve 19 have been switched to take the right and left-hand side positions, respectively, i.e. the state in which no signal is delivered neither to the solenoid coil 20 nor to the solenoid coil 21, the pistons 7,8 are pressurized and moved solely by the braking hydraulic pressure in the braking oil chamber 11, because the control oil chambers 12,12′ are opened into the tank T. As a result, the braking torque increases freely in accordance with the braking operation made by the driver.

In a second state of operation in which the outlet valve 19 has been switched to take the right-hand side position, i.e. the state in which the signal is delivered to the solenoid coil 21 to energize the latter, the control oil chambers 12,12′ are disconnected from the tank T, so that the control oil in the control oil chambers 12,12′ is blocked. Therefore, the pistons 7,8 are prevented from moving further, even if the braking oil pressure in the braking oil chamber 11 is increased. Consequently, the braking torque is maintained constant, irrespective of the braking operation made by the driver. This second state of operation is adopted when there is a possibility of a lock of the wheel.

In a third state of operation in which the inlet valve 14 and the outlet valve 19 have been switched to assume the left and right positions, respectively, i.e. in the state in which both of the solenoid coils 20,21 are in receipt of respective signals, the control oil discharged from the pump P is forcibly fed into the control oil chambers 12,12′ through the accumulator 13 and the inlet valve 14. Since the control oil chambers 12,12′ in this state are insulated from the tank T, the pistons 7,8 are moved toward each other, overcoming the braking hydraulic pressure in the braking oil chamber 11. As a result, the braking torque is decreased irrespective of the braking operation of the driver. This third state of operation is adopted when the wheel is in danger of the lock, i.e. when the possibility of lock of the wheel is greater.

In order to find the rate of slip of the wheel, it is necessary to estimate the velocity of the automobile. A practical example of detecting means 32 for detecting the velocity of the automobile will be described hereinafter with reference to FIGS. 2 and 3.

Figure 3:
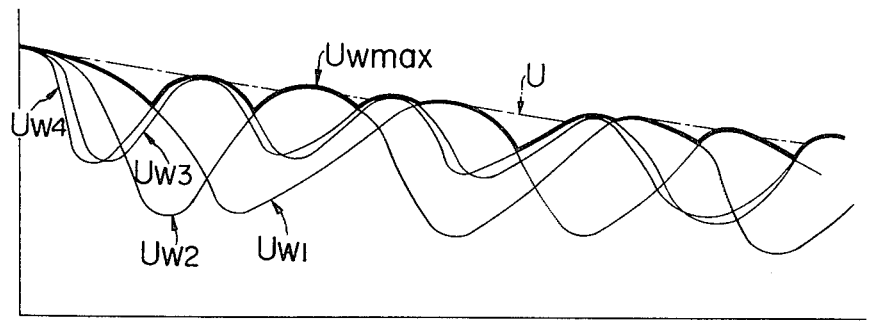
FIG. 3 is a graph for explaining the operation of the vehicle-speed detecting means as shown in FIG. 2.

Referring first to FIG. 2, the wheels are provided with respective wheel-speed detectors 22,23,24 and 25 adapted to detect the peripheral speeds of respective wheels. More specifically, these wheel-speed detectors are adapted to produce and deliver wheel speed signals in the form of frequency signals $f_1, f_2, f_3$ and $f_4$ in proportion to the peripheral speeds of corresponding wheels. These frequency signals $f_1, f_2, f_3$ and $f_4$ are in proportion to the peripheral speeds of corresponding wheels. These frequency signals $f_1, f_2, f_3$ and $f_4$ representing the peripheral speeds of respective wheels are then delivered to frequency converters 26, 27, 28 and 29, where they are converted into voltage signals $Uw1, Uw2, Uw3$ and $Uw4$ which are easier to handle. The voltage signals are, needless to say, in proportion to the peripheral speeds of respective wheels. FIG. 3 shows how the voltage signals $Uw1, Uw2, Uw3$ and $Uw4$ representative of the speeds of respective wheels are changed in relation to the time elapsed, when the antiskid device is functioning.

Referring again to FIG. 2, the wheel-speed voltage signals $Uw1, Uw2, Uw3$ and $Uw4$, which are the output from respective frequency-voltage converters are then delivered to a high select circuit 30. The high select circuit 30 is adapted to select the wheel-speed voltage signal having the highest level of all wheel-speed voltage signals $Uw1, Uw2, Uw3, Uw4$ and produces the maximum wheel-speed voltage signal $Uwmax$ as the output, as shown by thick line in FIG. 3.

The maximum wheel-speed voltage signal $Uwmax$ produced by the high select circuit 30 is then delivered to a memory circuit 31 which has a constant current-discharging characteristic corresponding to a standard or reference deceleration during the braking. The memory circuit 31 produces, upon receipt of the maximum wheel-speed voltage signal $Uwmax$, an estimated-vehicle-speed voltage signal $U$ which is an attenuating signal having a gradient determined by the discharging characteristics of the memory circuit 31, as shown by a chain line in FIG. 3.

Figure 4B:
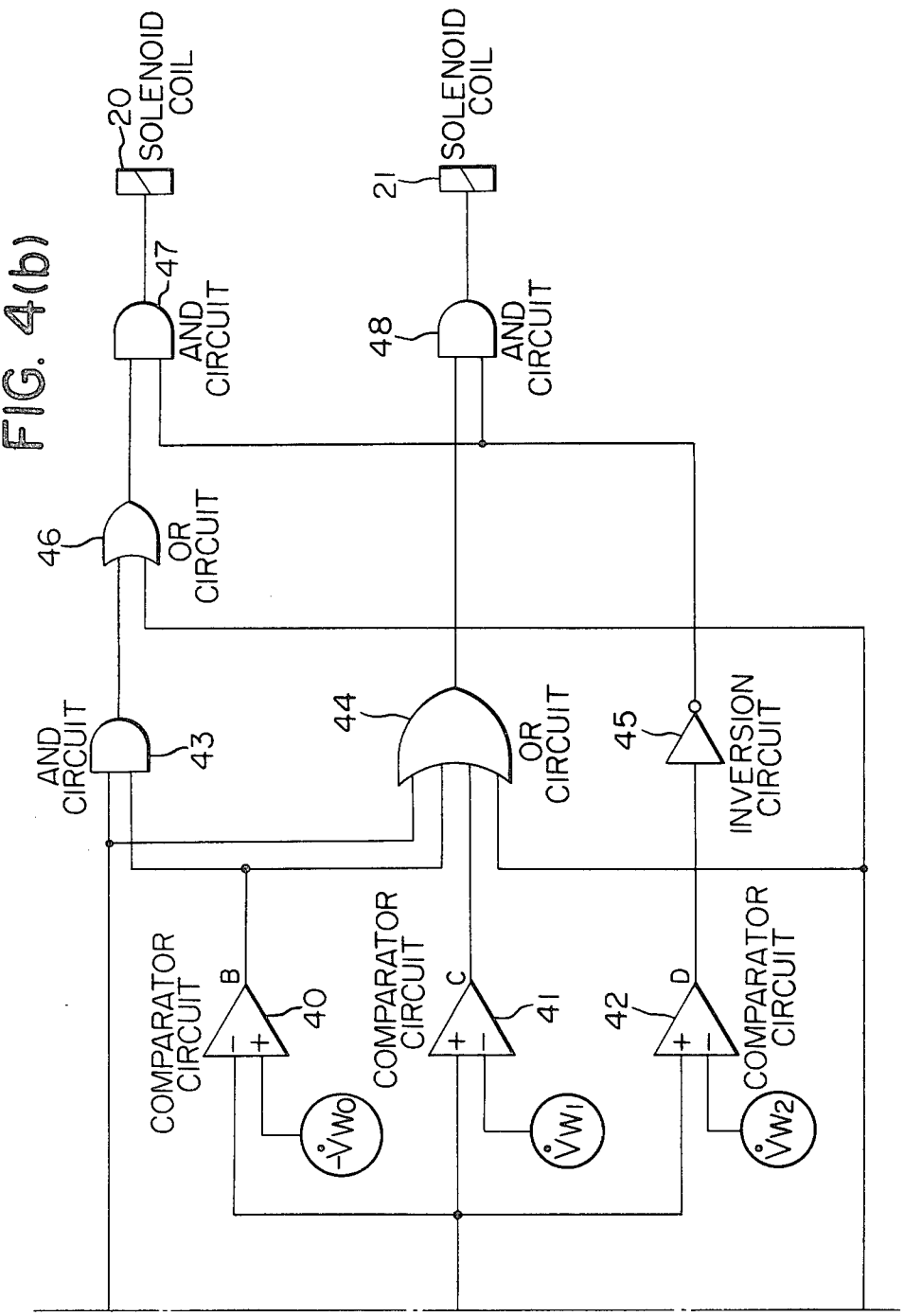

The estimated-vehicle-speed voltage signal thus obtained is delivered, as shown in FIGS. 4(a) and 4(b), to a reference wheel-speed signal setting circuit 33 which is adapted to set, upon receipt of the estimated-vehicle-speed voltage signal $U$, such a wheel speed as to cause a predetermined rate $\lambda$ of slip. This circuit 33 consists of a division circuit and produces a reference wheel-speed voltage signal $U_R$ given by the following equation.

$$U_r = (1-\lambda)U$$

The reference wheel-speed voltage signal $U_R$ is thus determined. A practical method and device for adding the rate of slip of the wheel to the controlling factor will be described hereinunder.

Referring to FIGS. 4(a) and 4(b), the peripheral speed of the wheel, which constitutes the object of the control made by the braking torque, is detected by the wheel-speed detector 34 which is adapted to produce a wheel-speed frequency signal $f_i$ in proportion to the speed of the wheel. This frequency signal $f_i$ is directly converted into a wheel-speed voltage signal $Uwi$ proportional to the wheel speed, by means of a frequency-voltage converter 35. In order to obtain this wheel-speed voltage signal $Uwi$, the wheel-speed detectors 22,23,24 and 25 and the frequency-voltage converters 26,27,28 and 29, in combination consitute the means 32 for estimating the vehicle speed, which may be used as the wheel-speed detector 34 and the frequency-voltage converter 35 for each wheel.

The wheel-speed voltage signal $Uwi$ is then delivered, simultaneously, to a comparator circuit 36, differentiation circuit 37 and another comparator circuit 38. The comparator circuit 36 is adapted to compare the wheel-speed voltage signal Uwi with the reference wheel-speed-voltage signal $U_R$ which is delivered from the reference wheel-speed setting circuit 33, and to produce an output only when the level of the wheel-speed voltage signal Uwi is smaller than that of the reference wheel-speed voltage signal $U_R$, i.e. only when the following inequality is satisfied.

$$Uwi < U_R$$

The differentiation circuit 37 is adapted to differentiate the wheel-speed voltage signal Uwi, so as to produce a wheel-acceleration voltage signal $\dot{U}wi$ as its output. This wheel-acceleration voltage signal $\dot{U}wi$ is immediately delivered to comparator circuits 40, 41 and 42.

The comparator circuit 40 is adapted to compare the wheel-acceleration voltage signal $\dot{U}wi$ with a reference deceleration voltage signal $-\dot{V}wo$ which represents a previously set negative reference acceleration, and to produce an output only when the wheel-acceleration voltage signal $\dot{U}wi$ is smaller than the reference wheel-deceleration voltage signal $-\dot{V}wo$, i.e. only when the following inequality is satisfied.

$$\dot{U}wi < -\dot{V}wi$$

The comparator circuit 41 compares the wheel-acceleration voltage signal $\dot{U}wi$ with a first reference wheel-acceleration signal $\dot{V}w1$, which has been set previously, and produces an output only when the value of the wheel-acceleration voltage signal $\dot{U}wi$ is higher than that of the first reference wheel-acceleration voltage signal $\dot{V}w1$, i.e. when the following inequality is satisfied.

$$\dot{V}w1 < \dot{U}wi$$

Further, the comparator circuit 42 is adapted to compare the wheel-acceleration voltage signal $\dot{U}wi$ with a previously set second reference wheel-acceleration voltage $\dot{V}w2$, the value of which is greater than that of the first reference wheel-acceleration signal $\dot{V}w1$, and to produce an output only when the value of the wheel-acceleration voltage signal $\dot{U}wi$ is greater than that of the second reference wheel-acceleration voltage signal $\dot{V}w2$, i.e. only when the following inequality is satisfied.

$$\dot{V}w2 < \dot{U}wi$$

The output side of this comparator circuit 42 is connected to the input side of an inversion circuit 45 which is adapted not to produce any output as long as the comparator circuit 42 keeps the delivery of its output signal but produce and maintain an output signal over a period in which no output is delivered by the comparator circuit 42. Thus, the inversion circuit 45 has a function to invert the output from the comparator circuit 45.

Meanwhile, the comparator circuit 38 is adapted to compare the wheel-speed voltage signal Uwi with a previously set second reference wheel-speed voltage signal Vwo which represents an extremely low peripheral speed of the wheel, and to produce an output when the value of the wheel-speed voltage signal Uwi is smaller than the value of the second reference wheel-speed voltage signal Vwo, i.e. only when the following inequality is satisfied.

$$Uwi < Vwo$$

The comparator circuit 38 is connected at its output side to the input side of a pulse generator 39 which is adapted to produce a pulse of a constant pulse width T immediately after the receipt of the output form the cmparator circuit 38. Namely, the pulse generator 39 is adapted to produce and deliver an output only over a constant period T after the delivery of the signal by the compartor circuit 38.

The output from the comparator circuits 36, 40, 41, 42, as well as the output from the pulse generator 39, are delivered to the solenoid coils 20 and 21 for actuating the inlet valve 14 and the outlet valve 19 as shown in FIG. 1, after a logical processing performed by a logical circuit described herein-under.

Both of the comparator circuits 36, 40 are connected at their output sides to the inputs of an AND circuit 43 and an OR circuit 44, while the comparator circuit 41 and the pulse generator 39 are connected at their output sides to the input of the OR circuit 44. The outputs of the AND circuit 43 and pulse generator 39 are further connected to the input side of an OR circuit 46, while the outputs of the OR circuit 46 and the inversion circuit 45 are connected to the input of an AND circuit 47. The outputs of the OR circuit 44 and the inversion circuit 45 are connected to the input of an AND circuit 48.

The AND circuit 47 is connected to the solenoid coil 20, such that, when the AND circuit 47 produces and delivers its output to the solenoid coil 20, the latter is energized to drive the inlet valve 14 from the right-hand side position to the left-hand side position as viewed in FIG. 1. Also, the AND circuit 48 is connected to the solenoid coil 21, and the AND circuit 48 produces and delivers its output to the solenoid coil 21, the latter is energized to drive the outlet valve 19 from the left-hand side position to the right-hand side position as viewed in FIG. 1.

The logical circuit is constructed, so that the output signals derived from the comparator circuits 36, 40, 41 and the inversion circuit 45, as well as the output signal from the pulse generator 39, are processed in the following manner.

It is supposed that the peripheral speed of the wheel is greater than a second reference peripheral-speed of the wheel which is set sufficiently small and, accordingly, that the value of the wheel-speed voltage signal Uwi is greater than the value of the second reference wheel-speed signal Vwo, so as not to allow the pulse generator 39 to produce the output signal. Under such a condition, it is judged that there is no possibility of wheel lock, if it is in one of the following cases (a) and (b).

(a) The value of the wheel-speed voltage signal Uwi is greater than that of the reference wheel-speed voltage signal $U_R$ and the value of the wheel-acceleration voltage signal $\dot{U}wi$ falls within the range between the first reference wheel-acceleration voltage signal $\dot{V}w1$ and the reference wheel-deceleration voltage signal $-\dot{V}wo$.

Namely, following inequalities are satisfied.

$$U_R < Uwi$$

$$-\dot{V}wo < \dot{U}wi < \dot{V}w1$$

(b) The value of the wheel-acceleration voltage signal $\dot{U}wi$ is greater than that of the second reference wheel-acceleration voltage signal $\dot{V}w2$, irrespective of the level of the wheel-speed voltage signal Uwi. The following inequality is satisfied.

$$\dot{V}w2 < \dot{U}wi$$

When the case is either the case (a) or (b), neither the AND circuit 47 nor the AND circuit 48 produces the output signal, so that the solenoid coils 20 and 21 are not energized. As a result, the inlet valve 14 and the outlet valve 19 are maintained in the aforementioned first state of operation, so that the braking torque is freely increased in accordance with the braking operation made by the driver.

Also, when the case is one of the following cases (c), (d) and (e), it is judged that there is a possibility of wheel lock.

(c) The value of the wheel-speed voltage signal Uwi is greater than the value of the reference wheel-speed voltage signal $U_R$ and the value of the wheel-acceleration voltage signal $\dot{U}wi$ is smaller than the value of the reference wheel-deceleration voltage signal $-\dot{V}wo$. The following inequalities are satisfied.

$$U_R < Uwi$$

$$\dot{U}wi < -\dot{V}wo$$

(d) Irrespective of the wheel-speed voltage signal Uwi, the value of the wheel-acceleration voltage signal $\dot{U}wi$ is greater than the value of the first reference wheel-acceleration voltage signal $\dot{V}w1$ but smaller that the value of the second reference wheel-acceleration voltage signal $\dot{V}w2$. The following inequality is satisfied.

$$\dot{V}w1 < \dot{U}wi < \dot{V}w2$$

(e) The value of the wheel-speed voltage signal Uwi is smaller than that of the reference wheel-speed voltage signal $U_R$ and the value of the wheel-acceleration voltage signal $\dot{U}wi$ falls within the range between the reference wheel-deceleration voltage signal $-\dot{V}wo$ and the second reference wheel-acceleration voltage signal $\dot{V}w2$. The following inequalities are satisfied.

$$Uwi < U_R$$

$$-\dot{V}wo < \dot{U}wi < \dot{V}w2$$

If the case is one of: (c), (d) and (e), only the AND circuit 48 produces its output signal, while the AND circuit 47 does not produce the output. In such a case, therefore, the solenoid coil 21 is energized while the solenoid coil 20 is not, so that the inlet valve 14 and the outlet valve 19 are kept in the aforementioned second state of operation, and the braking torque is not increased further but maintained constant, even if the force exerted by the drivers foot on the brake pedal is increased.

Further, if that of is the case (f) stated below, it is judged that the wheel is in danger of lock.

(f) The level of the wheel-speed voltage signal Uwi is smaller than that of the reference wheel-speed voltage signal $U_R$ and the value of the wheel-acceleration voltage signal $\dot{U}wi$ is smaller than the value of the reference wheel-deceleration voltage signal $-\dot{V}wo$. The following inequalities are satisfied.

$$Uwi < U_R$$

$$\dot{U}wi < -\dot{V}wo$$

In this case, both of the AND circuits 47 and 48 are allowed to produce their output signals. Consequently, both of the solenoid coils 20 and 21 are actuated to put the inlet valve 14 and the outlet valve 19 in the third state of operation, so that the braking torque is decreased irrespective of the braking operation made by the driver.

If it is supposed that the peripheral velocity of the wheel has become extremely small to such an extent that the level of the wheel-speed voltage signal Uwi comes down below the level of the second reference wheel-speed voltage signal Vwo, the comparator circuit 38 produces an output, so that the pulse generator 39 produces an output pulse signal of a predetermined pulse width or duration T. This being the case, the level of the wheel-acceleration voltage signal $\dot{U}wi$ is smaller than that of the second reference wheel-acceleration voltage signal $\dot{V}w2$, so that the inversion circuit 45 produces its output signal. Therefore, the AND circuits 47 and 48 produce their output signals, irrespective of the outputs from the comparator circuits 36,40 and 41, over a period T of duration of the pulse generated by the pulse generator 39. Consequently, the solenoid coils 20,21 are energized over the period T, so as to place the inlet and outlet valves 14,19 in the third state of operation, thereby to reduce the braking torque irrespective of the braking effort made by the driver.

When the vehicle under braking has entered a road whose surface has a low coefficient of friction from a road whose coefficient of friction is relatively high, a lock of wheel may take place due to a lag of response of the control system. In such a case, the comparator circuit 38 and the pulse generator 39 in combination function as an additional circuit to release the wheel from the locked state and to securely prevent subsequent lock.

A division circuit 49 and a comparator circuit 50 as shown in FIGS. 5(a) and 5(b) may be used in place of the combination of the comparator circuit 38 and the pulse generator 39 as shown in FIGS. 4(a) and 4(b). More specifically, in the arrangement as shown in FIGS. 5(a) and 5(b) the estimated-vehicle-speed voltage signal U is delivered also to the division circuit 49, which is provided separately from the aforementioned division circuit 33. The division circuit 49 sets a low reference wheel-speed voltage signal $U_R'$ of a level much lower than that of the reference wheel-speed voltage signal $U_R$ and delivers the low reference wheel-speed voltage signal $U_R'$ as its output to the comparator circuit 50. The comparator circuit 50 then compares the low reference wheel-speed voltage signal $U_R'$ with the wheel-speed voltage reference signal Uwi, and produces an output signal only when the level of the wheel-speed voltage signal Uwi is smaller than that of the low reference wheel-speed voltage signal $U_R'$, and delivers it to the OR circuits 44 and 46. Other portions of the arrangement as shown in FIGS. 4(a) and 4(b) than specifically mentioned above are materially identical to those of FIGS. 4(a) and 4(b).

Therefore, in the circuit arrangement as shown in FIGS. 5(a) and 5(b), both of the solenoid coils 20,21 are energized to put the inlet and outlet valves 14,19 into the third state of operation, so as to decrease the braking torque independently of the driver's effort, when the level of the wheel-speed voltage signal Uwi has come down below the level of the low reference wheel-speed voltage signal $U_R'$.

Figure 6:
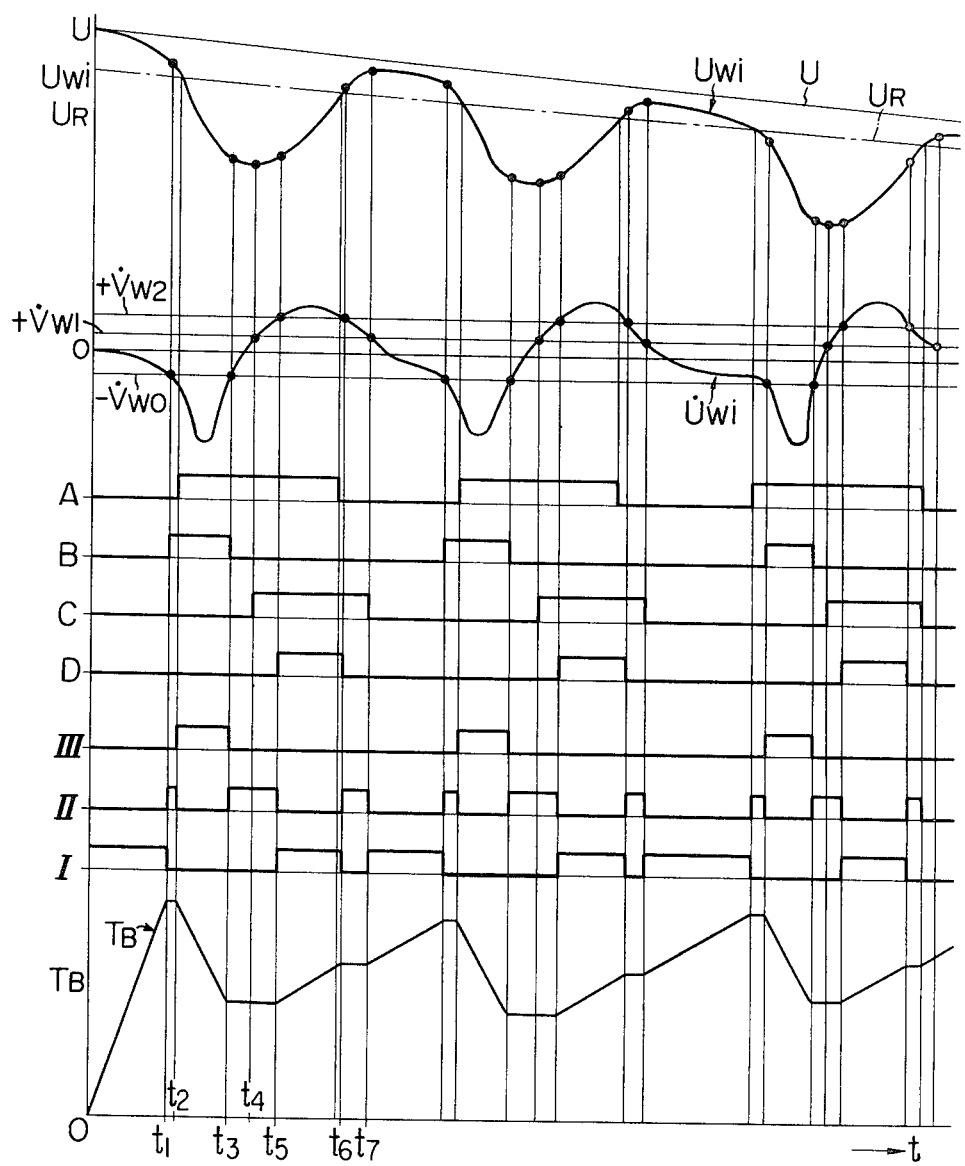
FIG. 6 is a timing chart for explaining, by way of example, the operations of the braking system and the oil pressure control system as shown in FIG. 1 and the wave forms of signals treated by the signal-processing circuit and logical circuit as shown in FIGS. 4(a) and 4(b)

FIG. 6 shows, by way of example, the operation of an anti-skid device incorporating the logical circuit as shown in FIGS. 4(a) and 4(b). In FIG. 6, axis of abscissa represents the time elapsed after the commencement of the braking. The axis of ordinate represents, from the upper end thereof to its lower parts, the estimated-vehicle-speed voltage signal U, wheel-speed voltage signal Uwi, reference wheel-speed voltage signal $U_R$, and further to the bottom, wheel-acceleration voltage signal $\dot{U}$wi, output signal A from the comparator circuit 36, output signal B from the comparator circuit 40, output signal C from the comparator circuit 41, output signal D from the comparator circuit 42, the third, second and first states III, II, I of operation of the inlet valve 14 and the outlet valve 19, and the braking torque $T_B$.

At an instant t=0 immediately after the commencement of the braking, the AND circuits 47, 48 do not produce the output signal, so that the oil pressure control system of the braking apparatus is in the state I of operation. The braking torque $T_B$ is therefore increased gradually and, accordingly, the levels of the wheel-speed voltage signal Uwi and wheel-acceleration voltage signal $\dot{U}$wi are lowered gradually.

At an instant t1, the level of the wheel-acceleration voltage signal $\dot{U}$wi comes down below the level of the reference wheel-deceleration voltage signal $-\dot{V}$wo. Then, the comparator circuit 40 comes to produce the output B. This means that it is judged that there is a possibility of lock of the wheel, and the AND circuit 48 produces an output. In this condition, however, the output A of the comparator circuit 36 has not been produced yet, so that the AND circuit 47 does not produce its output. Consequently, the oil pressure control system is held in the state II of operation, so as to maintain a braking torque $T_B$ substantially constant.

In this state, the braking torque $T_B$ assumes an excessively large value, due to the time lag of response of the oil pressure control system or the like reason, so that the wheel-speed voltage signal Uwi continues to decrease. As a result, the comparator circuit 36 produces an output signal A at an instant t2. Since both of the outputs A and B from the comparator circuits 36 and 40 are available at this instant, it is judged that the wheel is in danger of lock. Then, both of the AND circuits 47 and 48 produce their outputs to energize both of the solenoid coils 20 and 21. Consequently, the oil pressure control system comes to assume the state III of operation so as to decrease the braking torque $T_B$.

In accordance with the reduction of the braking torque $T_B$, the acceleration of the wheel increases gradually. As a result, the level of the wheel-acceleration voltage signal $\dot{U}$wi comes to exceed the level of the reference wheel-deceleration voltage signal $-\dot{V}$wo at an instant t3. Consequently, the comparator circuit 40 ceases producing the output B, and it is judged that the danger of lock of wheel has been swept off. In this state, although the AND circuit 47 stops delivering output and the output from the comparator circuit 36 is such that the AND circuit 48 continues to deliver its output. Thus, the oil pressure system comes again to assume the state II of operation, so as to keep the braking torque $T_B$ substantially constant.

In this state, however, the braking torque $T_B$ has been reduced to an excessively low level, due to the time lag of response of the oil pressure control system or the like reason, so that the wheel-acceleration voltage signal $\dot{U}$wi continues to increase. At the same time, the wheel-speed voltage signal Uwi comes to rise and, at an instant t4, the level of the wheel-acceleration voltage signal $\dot{U}$wi comes to exceed that of the first reference wheel-acceleration voltage signal $\dot{V}$w1, so as to cause the comparator circuit 41 to produce its output C. Further, at an instant t5, the level of the wheel-acceleration voltage signal $\dot{U}$wi comes to exceed that of the second reference wheel-acceleration signal $\dot{V}$w2, so that the output D is produced by the comparator circuit 42.

As a result, it is judged that there is no possibility of wheel lock, and both of the AND circuits do not deliver their outputs to de-energize the solenoid coils 20, 21. Consequently, the oil pressure control system comes again to assume the state I of operation, to allow the braking torque $T_B$ to increase again.

In accordance with the increment of the braking torque $T_B$, the level of the wheel-acceleration voltage signal $\dot{U}$wi becomes lower than that of the second reference wheel-acceleration voltage signal $\dot{V}$w2 at an instant t6, so that the comparator circuit 42 stops delivering its output D. However, since the output C of the comparator circuit 41 is still alive, it is judged that there is a possibility of wheel lock, and the AND circuit 48 delivers its output so as to energize the solenoid coil 21. Consequently, the oil pressure system resumes the second state II of operation, so as to maintain the braking torque $T_B$ substantially constant.

As the level of the wheel-speed voltage signal Uwi is raised to such a level as to maintain an adequate rate of slip of wheel, at an instant t7, the level of the wheel-acceleration voltage signal $\dot{U}$wi comes down below the level of the first reference wheel-acceleration signal $\dot{V}$w1, so that the comparator circuit 41 stops delivering its output C. In this state, it is judged that the possibility of the lock of wheel has been wiped off. Since both of the AND circuits 47, 48 do not produce their outputs in this state, both solenoid coils 20, 21 are not energized to make the oil pressure control system assume the first state I of operation to allow the braking torque $T_B$ to increase.

The above stated operation of the oil pressure control system is in order repeated to lower the vehicle speed without being accompanied by the lock of wheel.

Figures 7, 7A:
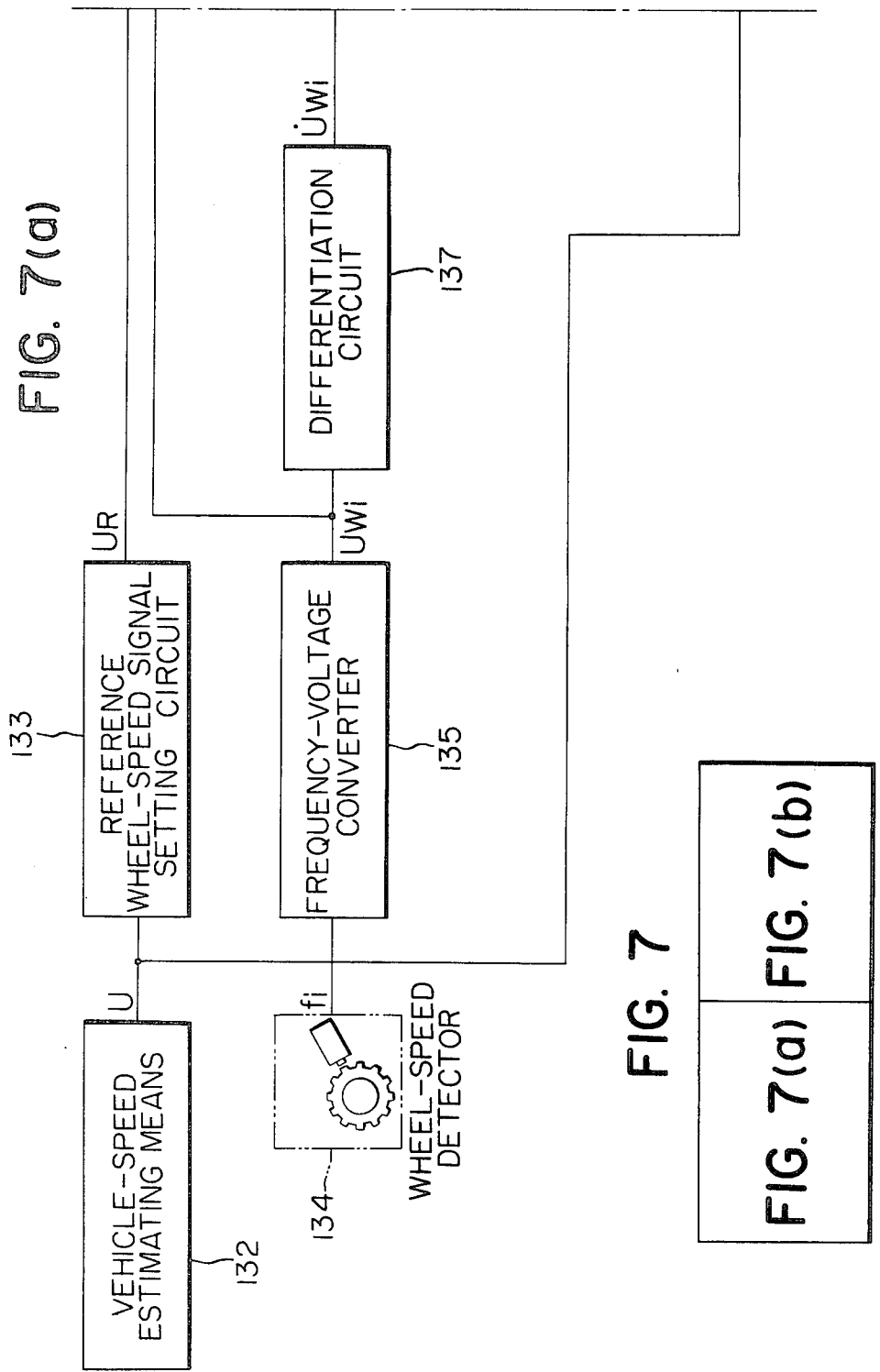
FIG. 7 is a view showing the association of FIGS. 7(a) and 7(b) with each other.
FIGS. 7(a) and 7(b) are one half and the other half, respectively, of a further modified form of the signal-processing and logical circuits.
Figure 7B:
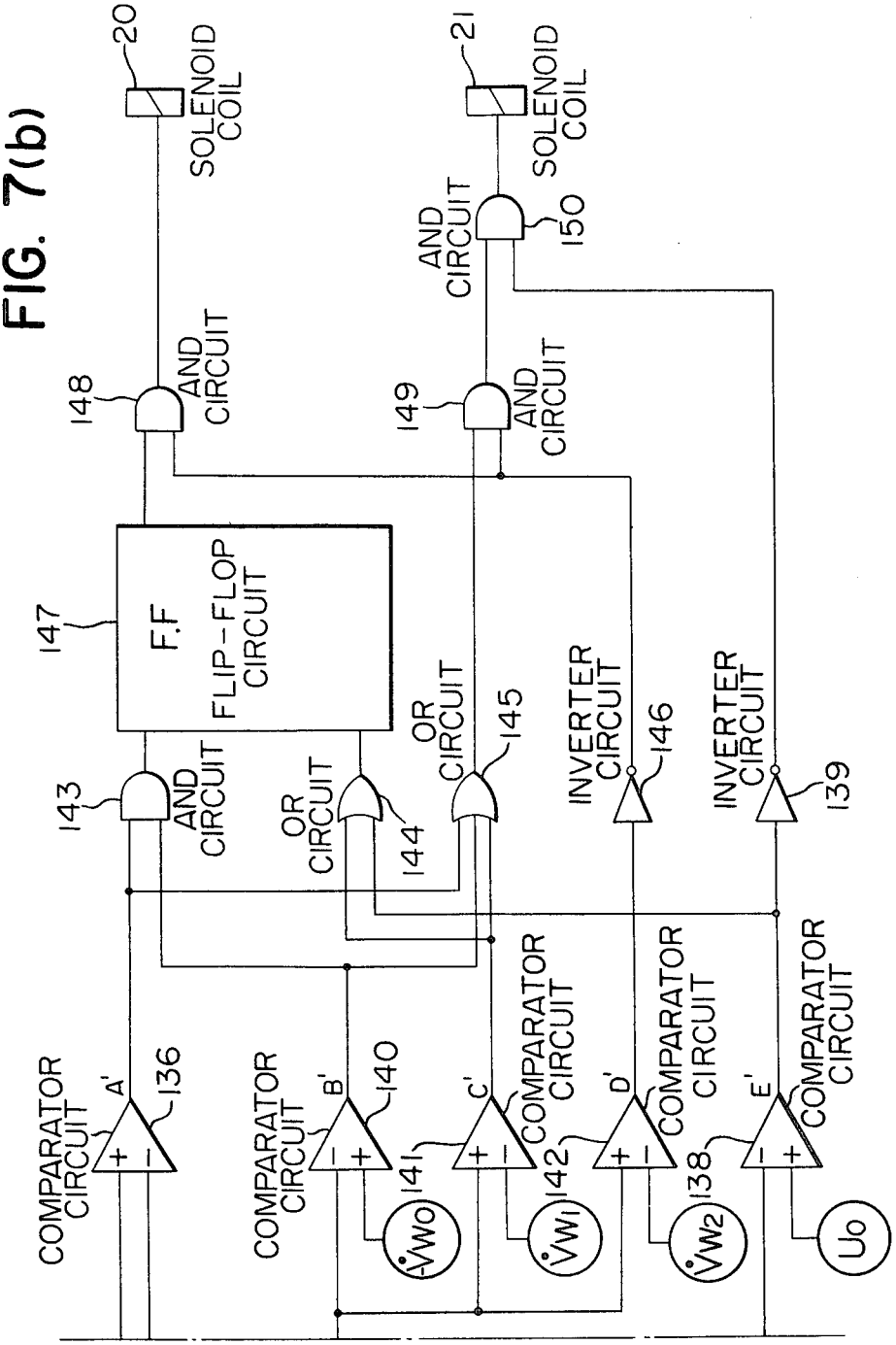

FIGS. 7(a) and 7(b) show still another embodiment of the signal-processing and logical circuits as shown in FIGS. 4(a) and 4(b).

Referring to FIGS. 7(a) and 7(b), the vehicle-speed voltage signal U as estimated by the vehicle-velocity estimating means 132 is delivered to the reference wheel-speed-signal setting circuit 133 and also to the comparator circuit 138. The reference wheel-speed-signal setting circuit 133 consists of a division circuit and is adapted to set such a reference wheel-speed to cause a predetermined slip rate $\lambda_o$ for the estimated vehicle-speed-voltage signal U. More specifically, this circuit 133 sets a reference wheel-speed voltage signal $U_R$ given by the following equation, and delivers it to the comparator circuit 136.

$$U_R = (1-\lambda_o)U$$

The peripheral speed of the wheel, as well as, the braking torque of which is controlled, is detected by the wheel-speed detector 134 annexed to the wheel. The wheel-speed detector 134 produces, as its output, a wheel-speed frequency signal fi proportional to the peripheral velocity of the wheel. This frequency signal is directly converted into a wheel-speed voltage signal Uwi proportional to the peripheral velocity of the wheel, by means of the frequency-voltage converter 135.

In order to obtain this wheel-speed voltage signal Uwi for each wheel, the wheel-speed detectors 22, 23, 24, 25 and frequency-voltage converters 26, 27, 28, 29, constituting the vehicle-speed estimating means 32 as shown in FIG. 2, may be used as the wheel-speed detectors 134 and the frequency-voltage converters 135 for respective wheels.

The wheel-speed voltage signal Uwi is then transmitted to the comparator circuit 136 and the differentiation circuit 137. The differentiation circuit 137 differentiates the wheel-speed voltage signal Uwi and produces a wheel-acceleration voltage signal $\dot{U}wi$ as its output. This wheel-acceleration voltage signal $\dot{U}wi$ is directly delivered to comparator circuits 140, 141 and 142. The comparator circuit 136 is adapted to compare the wheel-speed voltage signal Uwi with the reference-wheel voltage signal $U_R$ and produces its output, only when the level of the wheel-speed voltage signal Uwi is smaller than that of the reference wheel-speed voltage signal $U_R$, and delivers its output A' to an AND circuit 143 and an OR circuit 145.

The comparator circuit 140 compares the wheel-acceleration voltage signal $\dot{U}wi$ with a previously set reference wheel-deceleration voltage signal $-\dot{V}wo$ which represents a predetermined negative reference acceleration. This comparator circuit 140 produces its output B' only when the level of the wheel-acceleration voltage signal $\dot{U}wi$ is smaller than that of the reference wheel-deceleration voltage signal $-\dot{V}wo$, and delivers the output B' to the AND circuit 143 and the OR circuit 145.

The comparator circuit 141 is adapted to compare the wheel-acceleration voltage signal $\dot{U}wi$ with a first reference wheel-acceleration voltage signal $\dot{V}w1$ which represents a previously set positive reference acceleration, and produces its output only when the level of the wheel-acceleration voltage signal $\dot{U}wi$ is greater than the level of the first reference wheel-acceleration signal $\dot{V}w1$. The output C' of this circuit is delivered to the OR circuits 144 and 145.

The comparator circuit 142 is adapted to compare the wheel-acceleration voltage signal $\dot{U}wi$ with a previously set second reference wheel-acceleration voltage signal $\dot{V}w2$ of a level higher than the first reference wheel-acceleration voltage signal $\dot{V}w1$, and produces an output D' only when the level of the wheel-acceleration voltage signal $\dot{U}wi$ is higher than the level of the second reference wheel-acceleration voltage signal $\dot{V}w2$. The signal D' is delivered to an inverter circuit 146.

The comparator circuit 138 is adapted to compare the estimated-vehicle-speed voltage signal U with a previously set low reference vehicle-speed voltage signal Uo, and produces its output E' only when the level of the estimated-vehicle-speed voltage signal U is smaller that the level of the low reference vehicle-speed voltage signal Uo. The output E' is delivered to the OR circuit 144 and the inverter circuit 139.

The output from the AND circuit 143 and the OR circuit 144 are delivered to a flip-flop circuit 147. The output from the flip-flop circuit 147 in turn is delivered to an AND circuit 148. The output from the OR circuit 145 is delivered to an AND circuit 149, while the output from the inverter circuit 146 is delivered to the AND circuit 148 and another AND circuit 149. The output from the inverter circuit 139 is delivered to an AND circuit 150. The output from the AND circuit 148 is delivered to the solenoid coil 20, while the other solenoid coil 21 receives the output from the AND circuit 150.

In the control logical circuit as shown in FIGS. 7(a) and 7(b), the low reference vehicle-speed voltage signal Uo represents a lower threshold vehicle speed as not to require the anti-skid operation. Therefore, when the estimated-vehicle-speed voltage signal U is smaller than the low reference vehicle-speed voltage signal Vo, the output E' delivered by the comparator circuit 138 is inverted by the inverter circuit 139 on its way to the AND circuit 150, so that no signal is delivered to the solenoid coil 21. Consequently, the braking torque can be increased freely in accordance with the braking operation made by the driver.

In contrast to the above, when the estimated-vehicle-speed voltage signal U is greater than the low reference vehicle-speed-voltage signal Uo, the inverter circuit 139 delivers its output to the AND circuit 150, although the comparator circuit 138 does not produce its output.

It is assumed here that a braking torque is applied to a wheel when the level of the estimated-vehicle-speed voltage signal U is greater than that of the low reference vehicle-speed voltage signal Uo. Since the deceleration of wheel is commenced simultaneously with the application of the braking torque, at least the comparators 141,142 do not produce their outputs, so that the output from the inverter circuit 146 is delivered to the AND circuits 148 and 149. Then, as the level of the vehicle-speed voltage signal Uwi has come down below the level of the reference wheel-speed voltage signal $U_R$ while the level of the wheel-acceleration voltage signal $\dot{U}wi$ comes down below the level of the reference wheel-deceleration voltage signal $-\dot{V}wo$, the comparator circuits 136 and 140 produce outputs A' and B', so that the AND circuit 143 comes to produce its output to make the flip-flop circuit 147 commence deliverey of its output. The flip-flop circuit 147 continues to produce its output until a next new signal is delivered thereto. As long as the flip-flop circuit 147 deliveres its output, the AND circuits 148,149 and 150 continue to produce their outputs, both of the solenoid coils 20,21 are energized. Thus, it is judged that there is a possibility of wheel lock, and the braking torque is decreased irrespective of the braking operation made by the driver.

As the braking torque is decreased, the speed of wheel is gradually increased to make the level of the wheel-acceleration voltage signal $\dot{U}wi$ greater than the level of the first reference wheel-acceleration voltage signal $\dot{V}w1$, beyond the level of the reference wheel-deceleration voltage signal $-\dot{V}wo$. In this state, the comparator circuit 141 produces its output C' and delivers it to the OR circuits 144 and 145. The flip-flop circuit 147, which has produced its output, stops producing the output due to a receipt of a signal from the OR circuit 144.

Meanwhile, provided that the level of the estimated-vehicle-speed voltage signal U is below the level of the low reference vehicle-speed voltage signal Uo, the comparator circuit 138 produces its output E' to cause the OR circuit 144 to produce the output. The flip-flop circuit 147 stops producing the output, by the receipt of the output from the OR circuit 144. In this state, neither of the AND circuits 148 and 150 produce the output, so that both of the solenoid coils 20,21 do not receive any signal.

On the other hand, if the flip-flop circuit 147 has stopped producing its output by the receipt of the signal C' from the comparator circuit 141, while the level of the estimated-vehicle-speed voltage signal U is still maintained higher than that of the low reference vehicle-speed voltage signal Uo, the AND circuit 148 does not produce any output and, accordingly, the solenoid coil 20 receives no signal. Although the other solenoid coil 21 is in receipt of the signal, the reduction of the braking torque is ceased at this instant.

Then, as the level of the wheel-acceleration voltage signal $\dot{U}wi$ is further increased beyond the level of the second referecne wheel-speed voltage signal $\dot{V}w2$, the comparator circuit 142 produces an output D'. The AND circuits 148,149 stop producing their outputs, because the signal D' is inverted by the inversion circuit 146. As a result, the delivey of signal to the solenoid coils 20, 21 is stopped to allow a free increase of the braking torque in accordance with the braking effort made by the driver.

Figure 8:
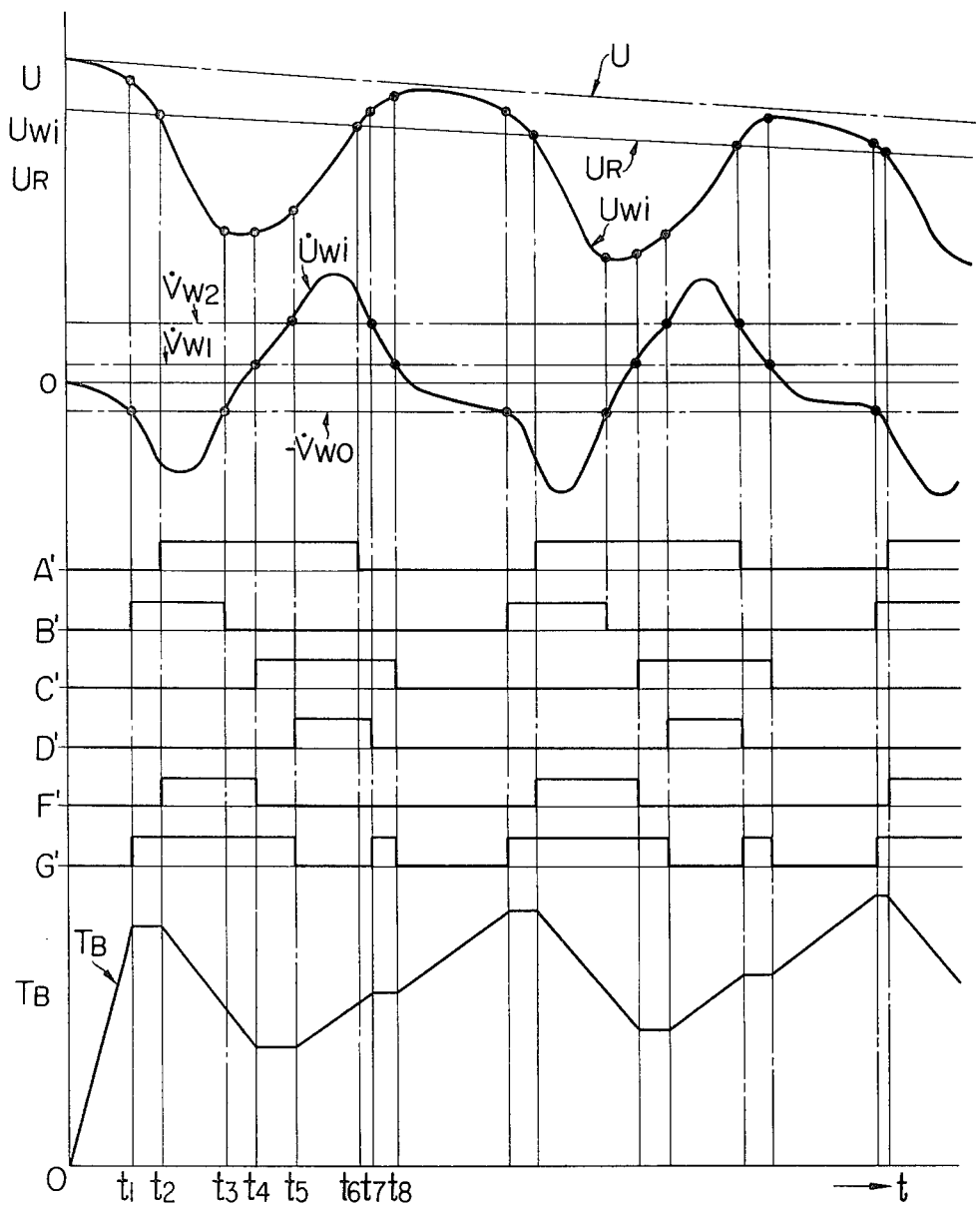
FIG. 8 is a timing chart for explaining, by way of example, the operations of the braking system and the oil pressure control system as shown in FIG. 1 and wave forms of various signals treated by the signal-processing circuit and the logical circuit as shown in FIGS. 7(a) and 7(b).

FIG. 8, by way of example, shows the manner of operation of an anti-skid device in incorporating a controlling logic circuit as shown in FIGS. 7(a) and 7(b). In FIG. 8, the axis of the abscissa represents the time elapsed. The axis of ordinate shows, from the top to bottom, the estimated-vehicle-speed voltage signal U, reference wheel-speed voltage signal $U_R$, wheel-speed voltage signal Uwi and then the reference wheel-deceleration voltage signal $-\dot{V}wo$, first reference wheel-acceleration voltage signal $\dot{V}w1$, second reference wheel-acceleration voltage signal $\dot{V}w2$ and the wheel-acceleration voltage signal $\dot{U}wi$, and further down to the bottom, the output A' of the comparator circuit 136, output B' from the comparator circuit 140, output C' from the comparator circuit 141, output D' from the comparator circuit 142, signal F' to be delivered to the solenoid coil 20, signal G' to be delivered to the solenoid coil 21 and the braking torque $T_B$.

At an instant immediately after the start of the braking, the braking torque $T_B$ is gradually increased and, accordingly, the levels of the wheel-speed voltage signal Uwi and the wheel-acceleration voltage signal $\dot{U}wi$ are decreased.

As the level of the wheel-acceleration voltage signal $\dot{U}wi$ comes down below the level of the reference wheel-deceleration voltage signal $-\dot{V}wo$ at an instant t1, the comparator circuit 140 produces its output B', so that the signal G' is delivered to the solenoid coil 21. Consequently, the braking torque $T_B$ is maintained substantially constant.

In this state, however, the braking torque $T_B$ becomes excessively large, due to a time lag of response of the oil pressure control system or the like reason, so that the level of the wheel-speed voltage signal Uwi continues to decrease further, and comes down below the level of the reference wheel-speed voltage signal $U_R$ at an instant t2. In this state, the comparator circuit 136 produces its output A', so that the signal F' is delivered to the solenoid coil 20, thereby decreasing the braking torque $T_B$.

The acceleration of the wheel is increased in accordance with decrease of the braking torque $T_B$ and, at an instant t3, the level of the wheel-acceleration voltage signal $\dot{U}wi$ grows larger than the level of the reference wheel-deceleration voltage signal $-\dot{V}wo$, so that the comparator circuit 140 stops producing its output. However, the delivery of the signal F' to the solenoid coil 20 is continued due to the action of the flip-flop circuit 147.

At an instant t4, the level of the wheel-acceleration voltage signal $\dot{U}wi$ comes to exceed the level of the first reference wheel-acceleration voltage signal $\dot{V}w1$. Then, the comparator circuit 141 produces its output C', so as to make the flip-flop circuit 147 stop the delivery of its output. Consequently, the delivery of the signal F' to the solenoid coil 20 is stopped, so that the braking torque $T_B$ is maintained constant.

In this state, the braking torque has become excessively low, because of a time lag of response of the oil pressure control system or the like reason. Therefore, the level of the wheel-acceleration voltage signal $\dot{U}wi$ as well as the level of the wheel-speed voltage signal Uwi continues to increase, and at an instant t5, the level of the wheel-acceleration voltage signal $\dot{U}wi$ is increased beyond the level of the second reference acceleration voltage signal $\dot{V}w2$, so as to allow the comparator circuit 142 to produce its output D'. As a result, the delivery of the signal to the solenoid coils 20,21, is stopped to allow the braking torque $T_B$ to increase. Then, at an instant t6, the level of the wheel-speed voltage signal Uwi comes to exceed the level of the reference wheel-speed voltage signal $U_R$ so that the comparator circuit 136 stops producing its output A'.

The level of the wheel-acceleration voltage signal $\dot{U}wi$ is gradually lowered as the braking torque $T_B$ is increased and, at an instant t7, comes down below the level of the reference wheel-acceleration voltage signal $\dot{V}w2$. In this state, the comparator circuit 142 stops producing its output D', so that a signal G' is delivered to the solenoid coil 21, thereby maintaining the braking torque $T_B$ substantially constant.

Then, as the level of the wheel-acceleration voltage signal $\dot{U}wi$ comes down below the level of the first reference wheel-acceleration voltage signal $\dot{V}w1$, at an instant t8, the comparator circuit 141 stops producing its output C', so that the delivery of the signal G' to the solenoid coil 21 is stopped to allow the braking torque $T_B$ to increase.

The above-stated operation of the oil pressure control system is repeated to lower the vehicle speed, without incurring any locking of the wheel.

In this embodiment, the braking system is so controlled that the braking torque is decreased over a period starting from an instant at which the level of the vehicle-speed signal is larger than the level of the low reference vehicle-speed signal and the levels of the wheel-speed signal and the reference wheel-acceleration signal have come down below the levels of the reference wheel-speed signal and the reference wheel-deceleration, respectively, and ending at an instant at which the level of the wheel-acceleration signal has become greater than the level of the reference wheel-acceleration signal.

Therefore, it is possible to control the braking system, such that the reduction of the braking torque is continued, in the speed range in which the locking of the wheel is liable to occur, from the instant at which the wheel is in danger of lock to the instant at which the acceleration of wheel has commenced again to wipe off the danger of the lock of wheel.

Consequently, according to the invention, there is provided a method of preventing wheel skid of the vehicle, which can surely prevent the skidding irrespective of the slipiness of the road surface and the time lag of response of the oil pressure control system.

The advantage of the invention is more remarkable when it is applied to the front wheels of the vehicle which are subjected to larger change of load as compared with the rear wheels.

Other embodiments and modifications of the present invention will suggest themselves to those skilled in the art, and all such of these as come within the spirit of this invention are included within its scope as best defined by the appended claims.

What is claimed is:

1. A method of preventing the skidding of a wheel of a vehicle comprising: detecting the peripheral speed of a wheel of a vehicle and picking it up as a wheel-speed signal ($Uwi$); deriving a wheel-acceleration signal ($\dot{U}wi$) representative of an acceleration of said wheel from said wheel-speed signal ($Uwi$); setting a first reference wheel-acceleration signal ($\dot{V}w1$) representative of a positive acceleration and a second reference wheel-acceleration signal ($\dot{V}w2$) of a level higher than that of said first reference wheel-acceleration signal, for comparison with said wheel-acceleration signal ($\dot{U}wi$); comparing during braking, said wheel-acceleration signals ($\dot{V}w1$, $\dot{U}wi$, $\dot{V}w2$); and controlling a braking torque exerted on said wheel such that said brake torque is held constant when the level of said wheel-acceleration signal ($\dot{U}wi$) is higher than the level of said first reference wheel-acceleration signal ($\dot{V}w1$) and lower than that of said second reference wheel-acceleration signal ($\dot{V}w2$), while said braking torque is increased when the level of said wheel-acceleration signal ($\dot{U}wi$) is higher than that of said second reference wheel-acceleration signal ($\dot{V}w2$) and setting a reference wheel-speed signal ($U_R$) representative of a predetermined reference wheel speed for comparison with said wheel-speed signal ($Uwi$); setting a reference wheel-deceleration signal ($-\dot{V}wo$) representative of a negative acceleration for comparison with said wheel-acceleration signal ($\dot{U}wi$), comparing during braking, said wheel-speed signal ($Uwi$) with said reference wheel-speed signal ($U_R$), and also said wheel-acceleration signal ($\dot{U}wi$) with both of said first reference wheel-acceleration signal ($\dot{V}w1$) and said reference wheel-deceleration signal ($-\dot{V}wo$), and controlling said braking torque in a manner such that it is increased when the level of said wheel-speed signal ($Uwi$) is higher than that of said reference wheel-speed signal ($U_R$) and simultaneously the level of said wheel-acceleration signal ($\dot{U}wi$) is lower than that of said first reference wheel-acceleration signal ($\dot{V}w1$) and higher than that of said reference wheel-deceleration signal ($-\dot{V}wo$).

2. A method of preventing the skidding of a wheel of a vehicle including the steps of: detecting the peripheral speed of a wheel of a vehicle and picking up a wheel-speed signal ($Uwi$); deriving a wheel-acceleration signal ($\dot{U}wi$) representative of an acceleration of said wheel from said wheel-speed signal ($Uwi$); setting a reference wheel-speed signal ($U_R$) representative of a predetermined reference wheel-speed, a first reference wheel-acceleration signal ($\dot{V}w1$) representative of a positive acceleration, and a second reference wheel-acceleration signal ($\dot{V}w2$) of a level higher than that of said first reference wheel-acceleration signal, and a reference wheel-deceleration signal ($-\dot{V}wo$) representative of a negative acceleration; comparing, during braking, said wheel-speed signal ($Uwi$) with said reference wheel-speed signal ($U_R$) and also said wheel-acceleration signal ($\dot{U}wi$) with said first and second reference wheel-acceleration signals ($\dot{V}w1$, $\dot{V}w2$) and said reference wheel-deceleration ($-\dot{V}wo$); controlling a brake torque exerted on said wheel such that said brake torque is held constant either when the level of said wheel-acceleration signal ($\dot{U}wi$) is higher than that of said first reference wheel-acceleration signal ($\dot{V}w1$) and lower than that of said second reference wheel-acceleration signal ($\dot{V}w2$) or when the level of said wheel-acceleration signal ($\dot{U}wi$) is higher than that of said reference wheel deceleration signal ($-\dot{V}wo$) and lower than the lever of said first reference wheel-acceleration signal ($\dot{V}w1$) if the level of said wheel-speed signal ($Uwi$) is lower than that of said reference wheel-speed signal ($U_R$), while said brake torque is increased when the level of said wheel-acceleration signal ($\dot{U}wi$) is higher than that of said second reference wheel-acceleration signal ($\dot{V}w2$) and further controlling said brake torque such that it is increased when the level of said wheel-speed signal ($Uwi$) is higher than that of said reference wheel-speed signal ($U_R$) and simultaneously the level of said wheel-acceleration signal ($\dot{U}wi$) is lower than that of said first reference wheel-acceleration signal ($\dot{V}w1$) and higher than that of said reference wheel-deceleration signal ($-\dot{V}wo$).

3. A method of preventing the skidding of the wheels of a vehicle as in claims 1 or 2, comprising: detecting the peripheral speeds of a plurality of wheels of said vehicle; selecting the largest peripheral speed from the detected peripheral speeds, obtaining an estimated vehicle speed approximating the actual vehicle speed during braking from the largest peripheral speed as selected and a preset rate of attenuation of the vehicle speed, and determining said reference wheel-speed signal ($U_R$) from the estimated vehicle speed and a preset slip rate ($\lambda o$) of said wheel.

* * * * *